United States Patent
Ogasawara

(10) Patent No.: US 8,140,600 B2
(45) Date of Patent: Mar. 20, 2012

(54) MEMORY POWER CONTROL METHOD AND MEMORY POWER CONTROL PROGRAM

(75) Inventor: Takeshi Ogasawara, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 301 days.

(21) Appl. No.: 12/622,470

(22) Filed: Nov. 20, 2009

(65) Prior Publication Data

US 2010/0138460 A1    Jun. 3, 2010

(30) Foreign Application Priority Data

Nov. 21, 2008   (JP) .................. 2008-298335

(51) Int. Cl.
G06F 17/30    (2006.01)
(52) U.S. Cl. ...................................................... 707/813
(58) Field of Classification Search .................. 707/609, 707/692, 694, 705, 790, 813, 821
See application file for complete search history.

(56) References Cited

U.S. PATENT DOCUMENTS

| | | | | |
|---|---|---|---|---|
| 4,851,987 | A * | 7/1989 | Day .............................. | 713/601 |
| 5,241,673 | A * | 8/1993 | Schelvis ....................... | 707/758 |
| 5,784,628 | A * | 7/1998 | Reneris ........................ | 713/300 |
| 7,251,671 | B2 * | 7/2007 | Wu et al. ...................... | 707/816 |
| 7,904,493 | B2 * | 3/2011 | Schmelter et al. ............ | 707/820 |
| 2008/0243969 | A1 * | 10/2008 | Wintergerst et al. .......... | 707/206 |

FOREIGN PATENT DOCUMENTS

| | | |
|---|---|---|
| JP | 2000-172386 A | 6/2000 |
| JP | 2002-297443 A | 10/2002 |
| JP | 2006-092532 A | 4/2006 |
| JP | 2008040606 | 2/2008 |
| JP | 2009-122733 A | 6/2009 |

OTHER PUBLICATIONS

O'Toole et al, Concurrent Compacting Garbage Collection of a Persistent Heap, 1993 ACM, pp. 161-174.*
Li et al, Performance-Directed Energy Management for Storage Systems, 2004 IEEE, pp. 38-49.*
Xiaodong Li et al, Performance Directed Energy Management for Main Memory and Disks, 2004 ACM, pp. 271-283.*
X. Li, et al, "Performance-directed energy management for storage systems", 2004, IEEE Micro.

* cited by examiner

*Primary Examiner* — Fred I Ehichioya
(74) *Attorney, Agent, or Firm* — Vazken Alexanian

(57) ABSTRACT

A method and a computer readable article of manufacture for controlling memory power consumption on a computer. The method includes a memory having a power saving mode and performs a garbage collection for collecting no-longer-needed objects in groups the no-longer-needed objects being allocated to memory blocks obtained by dividing a memory's address space by a predetermined constant size. The method includes the steps of dividing a heap area of the memory into a number of sub-heap areas; managing the sub-heap areas; and changing the number of sub-heap areas used for garbage collection based on a magnitude correlation between a required time for the garbage collection and a predefined target value.

12 Claims, 8 Drawing Sheets

MEMORY POWER CONTROL METHOD AND MEMORY POWER CONTROL PROGRAM

CROSS-REFERENCE TO RELATED APPLICATION

This application claims priority under 35 U.S.C. §119 from Japanese Patent Application No. 2008-298335 filed Nov. 21, 2008, the entire contents of which are incorporated herein by reference.

BACKGROUND OF THE INVENTION

1. Field of the Invention

The present invention relates to a memory power control method and a memory power control program for reducing a memory's power consumption. More particularly, the present invention relates to a memory power control method and a memory power control program to be employed in generational heap memory.

2. Description of Related Art

Reducing a computer's power consumption is an ongoing challenge. In a computer, memory consumes 1.5 times more power than a CPU. In a data center, memory power consumption is said to account for 27% of the total power consumption of the data center (see Li, X. et al, "Performance-directed energy management for storage systems," IEEE Micro, 2004). Thus, from the viewpoint of saving energy, reducing memory power consumption is an extremely important issue.

In this regard, a memory module which supports power saving has a power saving mode. The address space of the physical memory of the memory module is divided into units (called ranks) of a constant size, and the memory module is switched to the power saving mode on the rank basis. However, it is difficult to use the power saving mode in a program that uses heap memory (heap area) and garbage collection (GC).

With the popularization of object-oriented languages and GC, programs require larger heap areas. In a program written in an object-oriented language, a storage area (memory area) in a heap area is allocated to each object representing a data set, and memory areas allocated to unused objects are freed up and reclaimed by GC. Performing GC increases the required time for processing the program, and thus leads to substantial performance deterioration. In other words, performing GC creates overhead for the program. In order to reduce the frequency of performing GC, the heap area should be made larger.

Moreover, certain experimental results show that many of objects created by a large-scale and performance-critical program, such as a server application program, use a memory area on the order of a gigabyte (GB) but survive only for a short period of time (nanoseconds to microseconds).

Previously, a computer has been proposed which intended to reduce memory power consumption based on its usage pattern (refer to Japanese Patent Application Publication No. 2008-40606, for example). Specifically, the memory has multiple memory banks whose power is controlled independently on the single bank basis, each of which includes multiple physical pages. In the computer, physical pages having similar usage frequencies are brought together into a single memory bank and a certain memory bank is selected as a power control target on the basis of the usage frequency, and the power of the selected memory bank is controlled.

However, memory allocation distributes to-be-accessed objects unevenly in a memory address space, and the accessed area moves quickly in an address space of a heap area. This means that objects that are frequently accessed do not concentrate in a certain rank, which causes all the ranks in the memory address space to be constantly accessed. Accordingly, such a program that uses heap area and GC has the problem of inevitable performance deterioration when switching to power saving mode.

In addition, in the technique disclosed in Japanese Patent Application Publication No. 2008-40606, an operating system (OS) generates statistics on access to pages, and brings together pages having similar access frequencies in the physical memory in accordance with the access statistics, which consequently leaves non-accessed pages in a certain rank. However, as with GC, operations such as generation of access statistics and memory copy increase the required time for processing a program which also causes performance deterioration. In addition, if access statistics are generated based on memory in which a to-be-accessed area moves quickly, it is statistically observed that the entire memory is evenly accessed at a substantially equal frequency. Hence, the technique disclosed in Japanese Patent Application Publication No. 2008-40606 has difficulty in switching each rank to the power saving mode.

SUMMARY OF THE INVENTION

In view of the above, an object of the present invention is to provide a memory power control method and a memory power control program that allow the switching of memory to a power saving mode without causing the performance deterioration that has been observed with conventional techniques using heap areas and GC.

According to an aspect of the present invention, a memory power control method for controlling memory power consumption is provided for use on a computer which (i) includes a memory having a power saving mode and (ii) performs a garbage collection for collecting no-longer-needed objects in groups, the no-longer-needed objects being allocated to memory blocks obtained by dividing a memory's address space by a predetermined constant size. The method includes the steps of dividing, by a dividing unit, a heap area of the memory into a plurality of sub-heap areas; managing, by a managing unit, the sub-heap areas; and changing, by a changing unit, the number of the sub-heap areas used for the garbage collection based on a magnitude correlation between a required time for the garbage collection and a predefined target value.

In the memory power control method according to this aspect of the present invention, the number of sub-heap areas is dynamically changed. Accordingly, the method allows the switching of a memory to a power saving mode without causing performance deterioration even in a computer in which garbage collection is performed.

According to another aspect of the present invention, a memory power control method for controlling memory power consumption is provided for use in a computer which (i) includes a memory having a power saving mode and (ii) performs a garbage collection for collecting no-longer-needed objects in groups, the no-longer-needed objects being allocated to memory blocks obtained by dividing a memory's address space by a predetermined constant size.

The method includes the steps of dividing, by a dividing unit, a heap area of the memory into a plurality of sub-heap areas; managing, by a managing unit, the sub-heap areas; changing, by a changing unit, the number of the sub-heap areas used for the garbage collection based on a magnitude correlation between a required time for the garbage collection and a predefined target value; identifying, by an identification unit, living objects and the living object's class according to an access profile which contains information regarding access to the objects, where living objects are objects which are accessed for more than a predefined period; bringing, by a bringing unit, the living objects together into a predetermined sub-heap area while performing the garbage collection; moving, by a moving unit, objects to an old heap area, that are living even after performing minor garbage collection more than a predetermined number of rounds where the garbage collection is generational garbage collection; dividing, by a dividing unit, the heap area into a young heap area and an old heap area; allocating, by an allocation unit, the objects to the young heap area; and performing, by a garbage collection unit, minor garbage collection when the young heap area is entirely exhausted, where minor garbage collection is garbage collection performed only on the young heap area; performing, by a garbage collection unit, full garbage collection when the old heap area is entirely exhausted, where full garbage collection is garbage collection performed on the entire heap; and bringing the living objects existing in the old heap area together into a predetermined sub-heap area of the old heap area when performing the full garbage collection.

The memory power control method according to this aspect of the present invention can cause a computer in which garbage collection is performed to execute the above steps and cause garbage collection to work as generational garbage collection, which is a combination of minor garbage collection for the young heap area and full garbage collection that is performed in response to memory space shortage in the old heap area. Accordingly, the method can reduce power consumption attributable to memory access based on how the generational garbage collection is performed.

According to another aspect of the present invention, a computer readable article of manufacture tangibly embodying computer readable instructions is provided for causing a data processing system to execute the steps of the above methods.

DETAILED DESCRIPTION OF THE PREFERRED EMBODIMENTS

Figure 1:
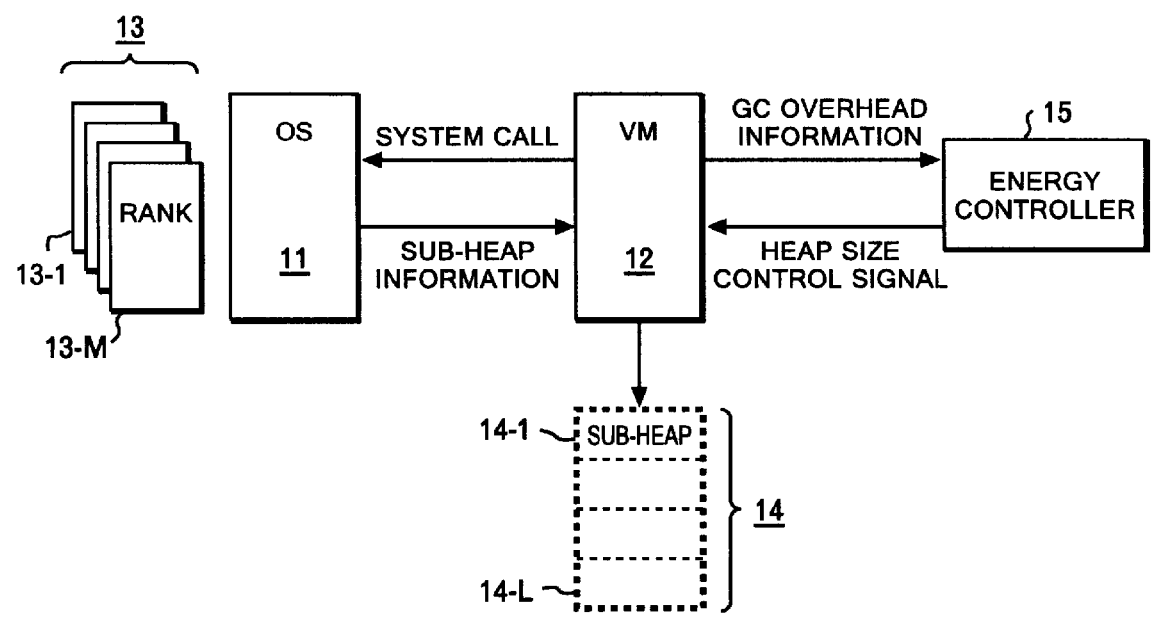
FIG. 1 shows an example of a computer system using a memory power control method according to an embodiment of the present invention.

Description is given of embodiments of the present invention with reference to the drawings. FIG. 1 shows an example of a computer system using a memory power control method according to the embodiment of the present invention.

In FIG. 1, an operating system (OS) 11 runs on a central processing unit (CPU), and bi-directionally communicates with a virtual machine 12 (e.g. Java Virtual Machine). A physical memory 13 includes multiple units (ranks) 13-1 to 13-M (M is an integer of 2 or more) which are obtained by dividing the address space of the physical memory 13 by a constant size. In the example shown in FIG. 1, a heap memory (heap area) 14, which is divided into multiple sub-heap areas 14-1 to 14-L (L is an integer of 2 or more), exists in a process space. The heap area 14 is controlled by an energy controller 15 via the VM 12 as will be described later.

In the computer system shown in FIG. 1, garbage collection (GC) is performed. The memory module supports power saving, and thus has a so-called power saving mode. In other words, the computer system shown in FIG. 1 operates on the GC basis, and thus collects no-longer-needed objects in groups, rather than as-needed.

Figure 2:
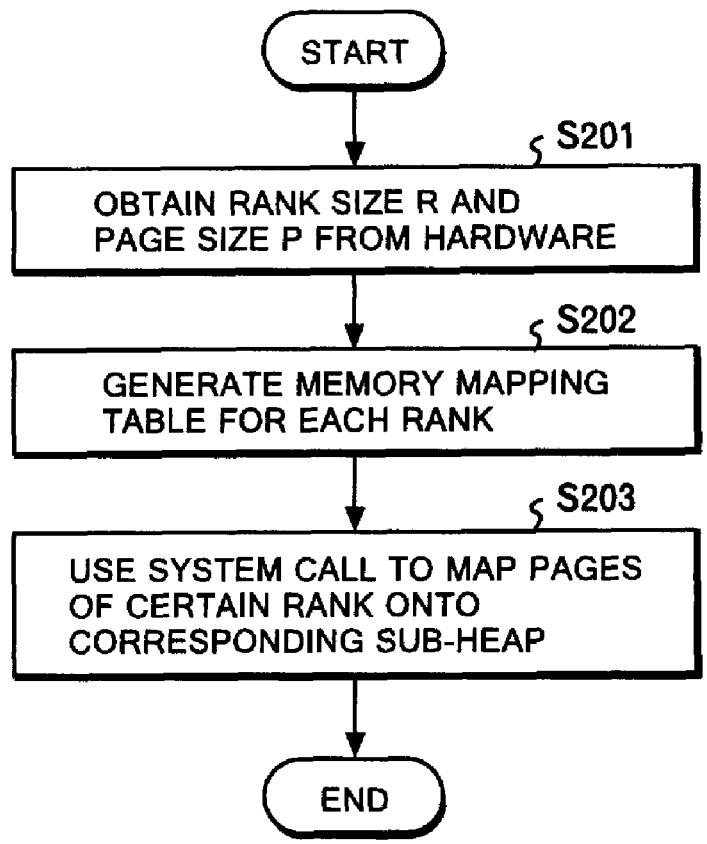
FIG. 2 is a flowchart initializing a heap area in the computer system in FIG. 1.

FIG. 2 is a flowchart for illustrating the initialization of the heap area 14, in which the OS obtains a rank size R and a page size P from the hardware, as information indicating how the physical address space is divided into the ranks 13-1 to 13-M in step S201 (Please note that each step included in flowcharts will be denoted by a reference symbol beginning with "S.")

Figure 3:
FIG. 3 shows how an address space is mapped.

Now, assume that each of the ranks 13-1 to 13-M has a size of R bytes. In this case, if address mapping is employed in which the 29th to 31st bits (where the 0th bit is the least significant bit) of each physical address indicate a rank, the rank transitions from one to another every 512 MB depending on the address space (refer to FIG. 3). Here, since the physical memory 13 is 4 GB and includes 8 ranks 13-1 to 13-8, the rank size R is 512 MB as described above.

Figure 4:
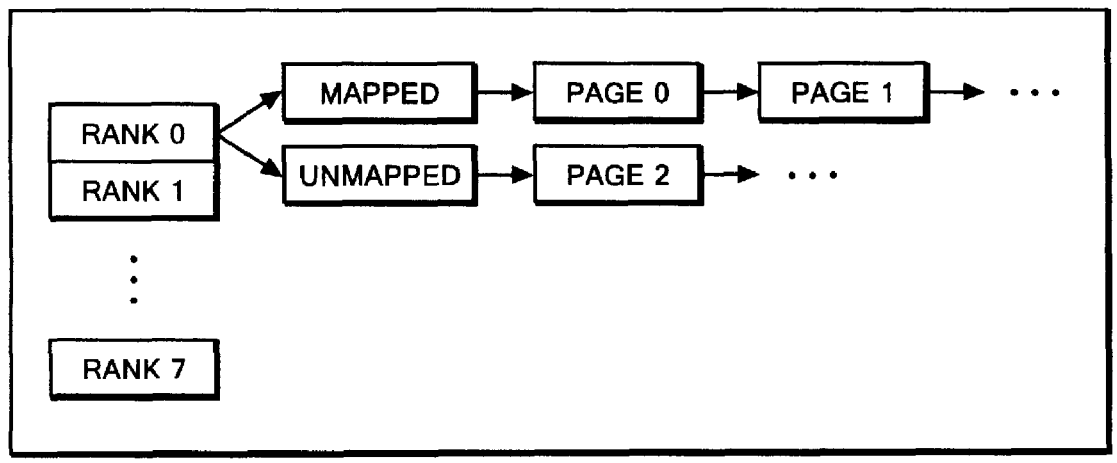
FIG. 4 illustrates memory management according to ranks performed by an operating system.

The OS uses the rank size R to manage the physical memory 13 on a single rank basis. For example, if the rank size R and the page size P are 512 MB and 2 MB, respectively, each rank includes 256 pages and the OS checks whether each of these 256 pages is mapped to an unused space or process space. In the example shown in FIG. 4, in which the physical memory 13 has 8 ranks 0 to 7, in rank 0, the OS detects that page 0 and page 1 are mapped but page 2 is not mapped. Similarly, the OS checks whether each page included in the rank 1 to 7 is mapped.

In addition, OS provides a special system call SC (syscall) to map each page onto a designated page in the process space which belong to a rank assigned with a designated rank number. In other words, the OS generates a memory mapping table for each rank (S202).

Figure 5:
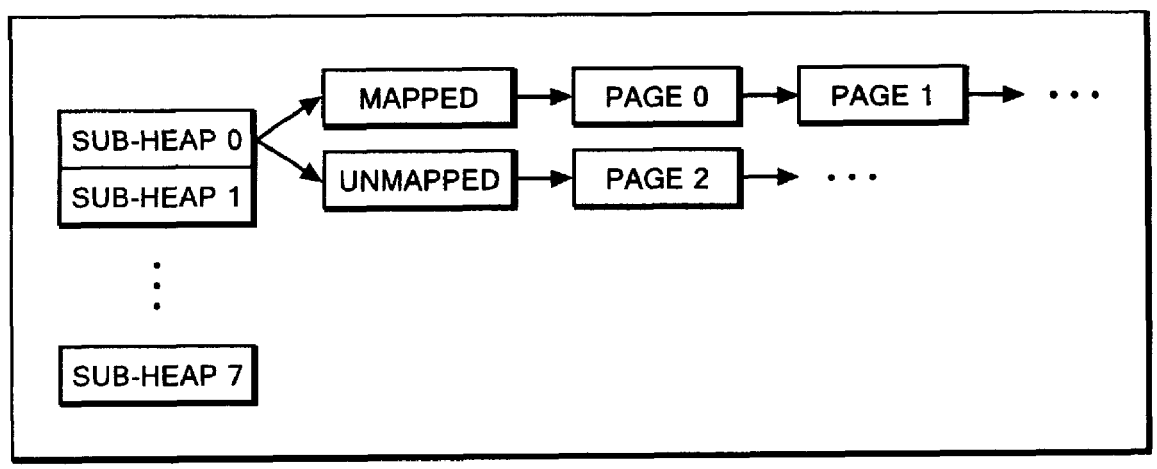
FIG. 5 illustrates sub-heap management performed by the operating system.

In initializing the heap area 14 which exists in the process space and is set as a target of power consumption management, the VM 12 divides the heap area 14 into multiple sub-heap areas 14-1 to 14-L, and manages the heap area 14 on a sub-heap area basis. The number of the sub-heap areas 14-1 to 14-L is equal to that of ranks, so that L=8 if the physical memory 13 has 8 ranks. The VM 12 invokes the system call SC, and maps pages in each of the ranks 13-1 to 13-8 onto one of the corresponding sub-heap areas 14-1 to 14-8. In other words, the VM 12 uses the system call SC to map pages of a certain rank onto the corresponding sub-heap (S203). Hence, as shown in FIG. 5, pages are mapped onto each of the eight sub-heaps 0 to 7 in a similar manner shown in FIG. 4. As FIG. 1 clearly shows, the ranks used by the VM 12 and the increase of use in sub-heap areas 14-1 to 14-L increases power consumption.

An example of reducing the load on a computer system will now be given. This example is under the assumption that all of the sub-heap areas 14-1 to 14-L (thus, all the ranks 13-1 to 13-M) are used when the maximum load is applied on the computer system (CPU utilization is 100%, for example).

In general, if the load on a computer decreases by half, the rate of consuming a heap area therein also decreases by half. However, in a computer system using GC, even if a heap consumption rate decreases by half, an entire heap area continues to be used, and thus the power consumption of a memory is kept at the maximum level.

In an embodiment of the present invention, in order to reduce the power consumption of memory in a computer system using GC, the number of sub-heap areas (thus ranks) used for GC among the sub-heap areas 14-1 to 14-L (the ranks 13-1 to 13-M) is reduced such that substantial program performance deterioration due to GC (GC overhead, that is, increase in required time for processing non-GC programs attributable to time consumption for the GC) per unit time can come closer to a predetermined target value. In addition, changes in the GC overhead along with reduction in the number of sub-heap areas used for GC among the sub-heap areas 14-1 to 14-L are modeled in advance.

Now, the above GC overhead is given as N×t, where N rounds of GC is performed per unit time and a CPU time (processing time of the CPU) for each GC round is t. The GC overhead is controlled such that N×t can come closer to a predetermined target value T (given as quality of service (QoS) from the outside, for example), in accordance with the rate of consuming the heap area 14.

Here, assume the sub-heap areas 14-1 to 14-L are not entirely used if the GC overhead is the target value T or less (N×t<T). Additionally, assume that the total number of sub-heaps is R; the change amount of the sub-heaps used for GC is n (n is a negative value); a rate of increase in GC frequency (that is, frequency of performing GC) caused by the change in the number of the sub-heaps used for GC is F(n); and the rate of increase in CPU time caused by the increase in GC frequency per a GC round is P(n).

The GC overhead after reduction in the number of sub-heap areas used for GC is obtained by the following expression.
[Formula 1]

$$N \times (1 + F(n)) \times t \times (1 + P(n)) \qquad [\text{I}]$$

Upon finding n that makes the expression [I] less than or equal to T, the VM 12 changes the number of sub-heaps used for GC by n. By contrast, if the GC overhead exceeds the target value T, which requires an increase in the number of sub-heaps used for GC, the VM 12 performs an operation contrary to the above. In other words, the VM 12 can change the number of sub-heaps used for GC, based on the magnitude correlation between the target value T and both or either of: a required time for GC, which is expressed by t×(1+P(n)) in the expression [I], and a frequency of performing GC, which is expressed by N×(1+F(n)) in this expression.

An example of performing GC in a computer system using a memory power control method will now be given according to an embodiment of the present invention. In general, so-called generational GC is often used as an efficient GC in a processing system based on Java (registered trademark), an object-oriented language which uses GC.

In generational GC, a heap area is divided into two generation areas: a young heap and an old heap. New objects are first sequentially allocated in the young heap. In a multi-processor system, this step is performed in order to make the system operate efficiently. Specifically, each object is not initially allocated in the young heap upon generation, but allocated in an allocation buffer. Here, the allocation buffer is an area that is allocated to each thread as its dedicated area from the young heap, and that has a size capable of allocating of multiple objects.

In the generational GC, if the entire young heap is exhausted, GC is performed only on the young heap (minor garbage collection: minor GC). Objects surviving multiple rounds of minor GC are moved to the old heap and excluded from the minor GC target, so that the CPU time required for minor GC can be reduced. If the entire old heap is exhausted, GC is performed on the entire heap area (full garbage collection: full GC).

Here, the above function F(n) is defined as follows. The rate of consuming a heap is independent of its size. Accordingly, the smaller the heap size is, the earlier the next round of GC starts, since the heap consumption rate is constant. Thus, the rate of increase in GC frequency can be simplified as the following expression.
[Formula 2]

$$F(n) = -n/R \qquad [\text{II}]$$

Meanwhile, the function P(n) can be defined as follows. Generally, the CPU time required for each GC round is independent of the heap size. Accordingly, the rate of increase in CPU time can be simplified as the following expression.
[Formula 3]

$$P(n) = 0 \qquad [\text{III}]$$

With these definitions, the GC overhead after the number of sub-heap areas used for GC is changed can be simplified from the above-described expression [I] to the following expression.
[Formula 4]

$$N \times t \times (1 - n/R) \qquad [\text{IV}]$$

Figure 6:
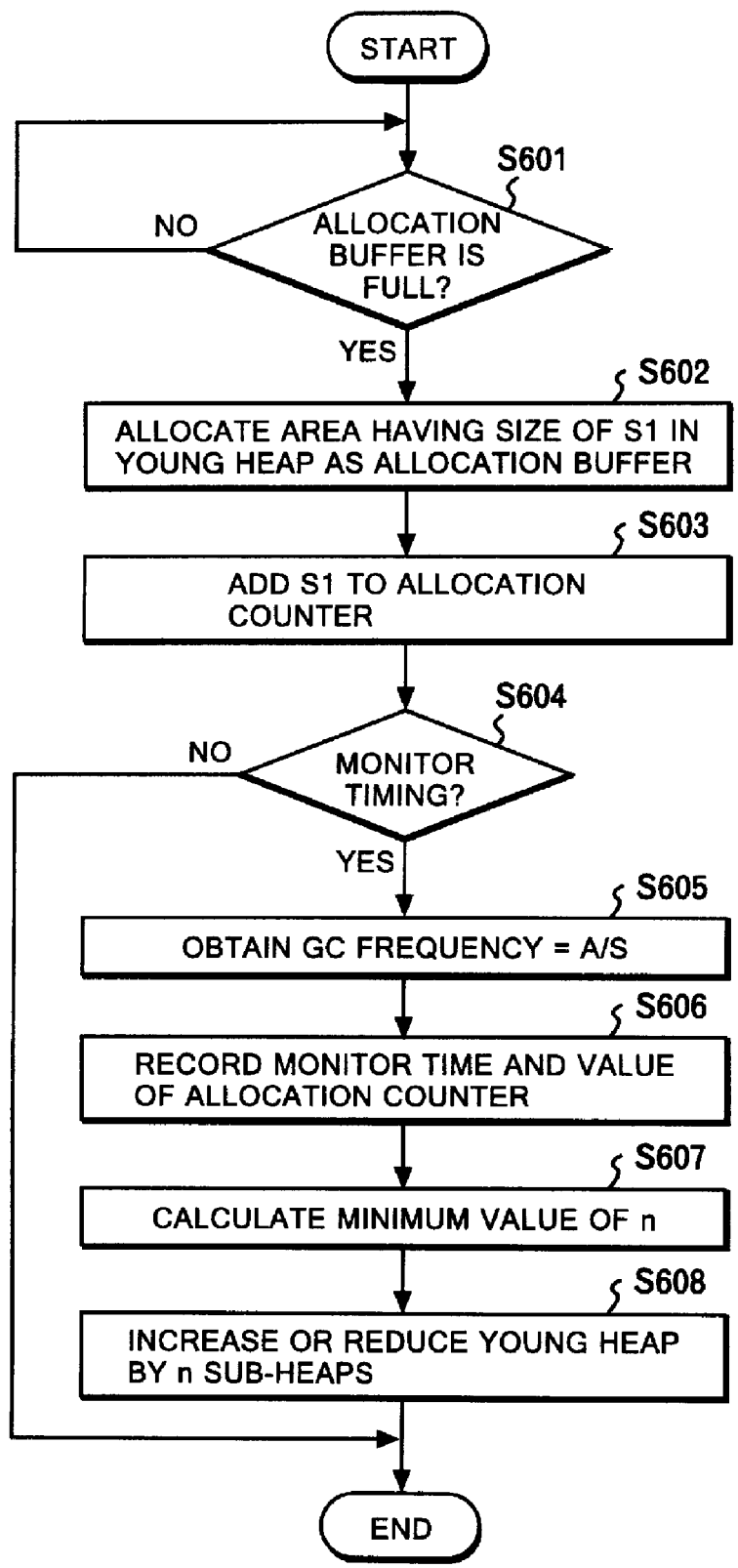
FIG. 6 is a flowchart for controlling the number of sub-heaps in a young heap.

FIG. 6 is a flowchart for controlling the number of sub-heaps in the young heap. As shown in FIG. 1, the VM 12 gives, to the energy controller 15, GC overhead information indicating the GC overhead, while the energy controller 15 gives a heap size control signal to the VM 12, as will be described later.

In FIG. 6, the energy controller 15 first checks whether or not the allocation buffer is FULL (S601).

If the allocation buffer is empty, the energy controller 15 allocates an area having a size of S1 in the young heap as the allocation buffer (S602), and adds S1 to an allocation counter (S603).

Then, the energy controller 15 checks whether or not it is a monitor timing (S604), and obtains a GC frequency N=A/S if it is the monitor timing (S605). Here, S indicates the current heap size, and A indicates an allocation rate calculated based on the current and previous values of the allocation counter and a monitoring interval. Subsequently, the energy controller 15 records the current monitor time and the current value of the allocation counter (S606).

As described above, the energy controller 15 monitors the value of the allocation counter periodically (every 10 ms, for example) by iterating the steps S602 to S606. In each iteration, the energy controller 15 calculates a recent average object consumption rate A by dividing an allocation size (a difference between a value obtained at the previous monitoring and a value obtained at the current monitoring) by a time elapsed since the previous monitoring, and thus obtains the GC frequency N as A/S, where the heap size is S. Thereafter, the energy controller 15 continues to perform the above determination.

The energy controller 15 deforms the GC overhead expressed by the above expression [IV] into the following expression by setting the range of the GC overhead to less than or equal to T, and calculates the minimum value of n that satisfies the following expression (S607).

[Formula 5]

$$n \geq -R \times (T/N/t - 1) \quad [V]$$

Now, assume that GC is performed under conditions where T=0.05 (5% of GC performance time), R=8 (8 ranks) and t=0.2 (0.2 seconds). In this case, if N=0.2 (once in 5 seconds), the relational expression for the GC overhead can be solved as follows.

[Formula 6]

$$n \geq 8 \times (0.05/0.2/0.2 - 1) = -2 \quad [VI]$$

Thus, in this example, the energy controller 15 can determine that the young heap should be reduced by 2 sub-heaps.

By contrast, in cases where the number of ranks is too small, the energy controller 15 can replace the expression [V] with the following expression, and calculate the minimum value of n that satisfies the following expression.

[Formula 7]

$$n \geq R \times (1 - T/N/t) \quad [VII]$$

If a similar calculation to above is performed under the assumption that N=0.3, the above expression [VII] can be solved as follows.

[Formula 8]

$$n \geq 8 \times (1 - 0.05/0.3/0.2) = 1.33 \quad [VIII]$$

Thus, in this example, the energy controller 15 can determine that the young heap should be increased by 2 sub-heaps.

As described above, the energy controller 15 observes N and determines whether and how to change the number of sub-heaps in the young heap by using a calculation of the heap consumption rate (estimating the GC frequency). The change in the heap consumption rate is automatically calculated by using the allocation counter during program execution. Note that the allocation counter counts the size of the allocation buffer every time an area in the young heap is allocated as the allocation buffer.

After that, the energy controller 15 causes the VM 12 to increase or reduce the young heap by n sub-heaps in accordance with increase or decrease of sub-heaps used for GC (S608).

In other words, the energy controller 15 includes a counter for the changed number of sub-heaps, which displays the target number of sub-heaps. For example, upon determining to reduce sub-heaps in the young heap by "2," where the current number of sub-heaps in the young heap is "8," the energy controller 15 writes "6" into the counter. Here, the current number of sub-heaps in the young heap can remain different from the value of the counter even after the energy controller 15 determines whether and how to change the number of sub-heaps in the young heap using the calculation of the heap consumption rate (estimating the GC frequency). In this case, the energy controller 15 increases or reduces the number of sub-heaps in the young heap to the value of the counter. Instead, the energy controller 15 can delay this change till the next minor GC round in order to reduce mutator overhead.

Specifically, in minor GC, the energy controller 15 reads the counter for the changed number of sub-heaps after each GC round, and increases or reduces the number of sub-heaps in the young heap to the value of the counter if the current number of sub-heaps in the young heap is different from the value of the counter. As described above, the allocation buffers for the respective threads are synchronously obtained from the young heap with reference to the counter for the changed number of sub-heaps every time the threads obtain the allocation buffers.

Figure 7:
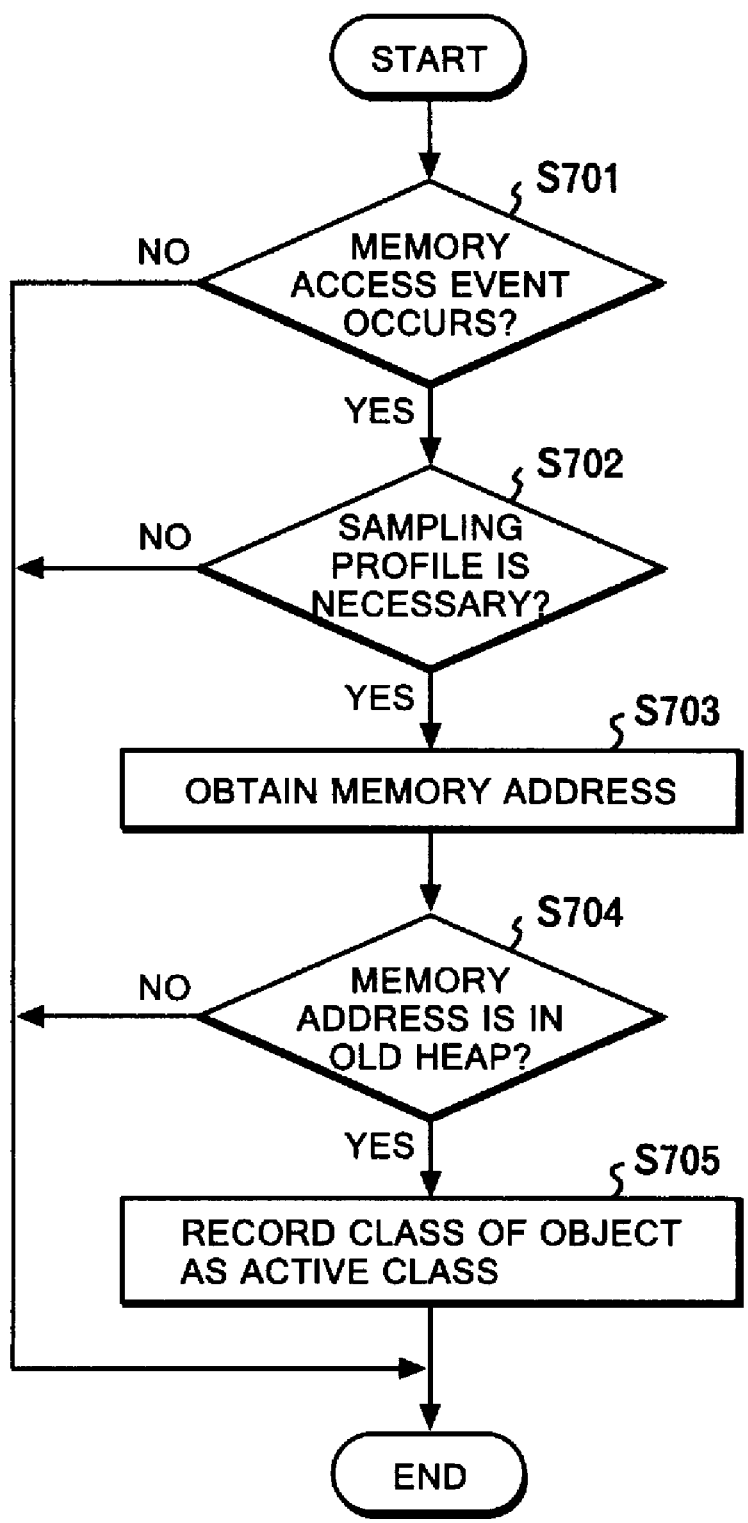
FIG. 7 is a flowchart for controlling the number of sub-heaps in an old heap.

FIG. 7 is a flowchart for controlling the number of sub-heaps in the old heap. The control for the old heap is slightly different from that for the young heap in that the old heap is continuously consumed till the first full GC round is performed. Thus, a sub-heap is added to the old heap as needed. If compaction is not performed after the full GC, surviving objects are distributed among multiple sub-heaps in the old heap. Here, compaction is processing to bring surviving objects together into a certain area.

Generally, compaction requires considerable time. Thus, compaction should preferably be performed as little as possible in the computer system including the VM 12. In this embodiment of the present invention, compaction is performed selectively on objects that are to be actually accessed so that these objects can be placed in as few sub-heaps as possible.

In FIG. 7, the computer system detects whether or not a memory access event occurs (S701). Then, if any memory access event occurs, the computer system determines whether or not a sampling profile for the event is necessary (S702). Upon determining that the sampling profile is necessary, the computer system obtains the sampling profile on access to the concerned object field.

For example, methods for obtaining the sampling profile includes: a method for recording field access by periodically activating instrumented code that records a field access; and a method for periodically recording a memory access by using a CPU performance counter for memory access. By using such methods, the computer system obtains an accessed memory address (S703), and determines whether or not the memory address is in the old heap (S704), and if so, records the class of the concerned object as an active class (S705).

Figure 8:
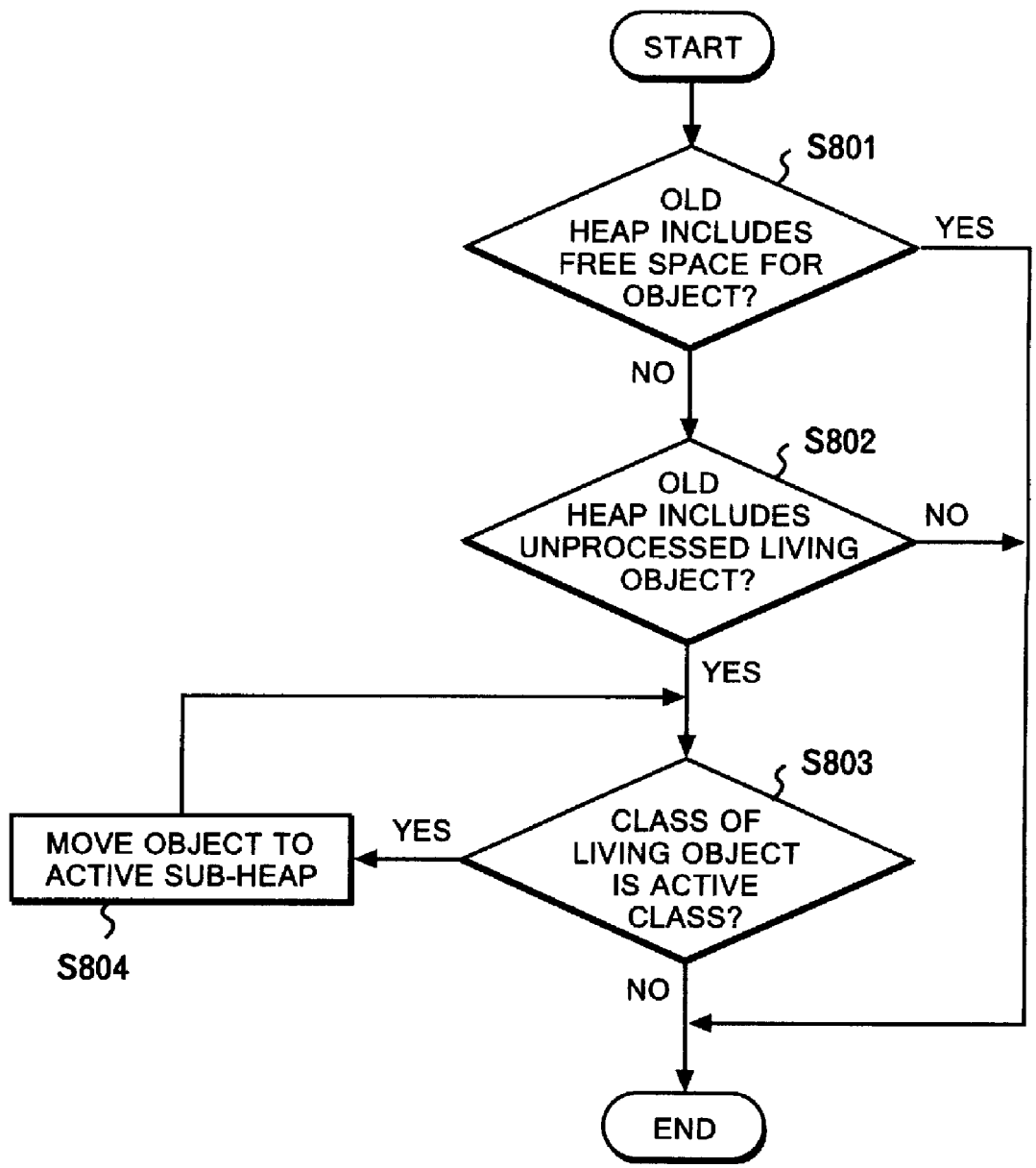
FIG. 8 is a flowchart for processing moving objects of active classes to active sub-heaps in full GC.

Incidentally, among objects surviving full GC, objects of the active classes are moved to predetermined sub-heaps (active sub-heaps) provided in advance. FIG. 8 is a flowchart for moving objects of the active classes to active sub-heaps in full GC. First, the computer system determines whether or not the old heap has free space for an object (S801). If the old heap has free space, the computer system determines whether or not the old heap has any unprocessed living objects (S802). If the old heap includes any unprocessed living objects, the computer system determines whether or not the class of this living object is an active class (S803). Then, if the class of the living object is an active class, the computer system moves the object to any of the active sub-heaps (S804).

As the above description clearly shows, in this embodiment of the present invention, if the old heap becomes full, the computer system performs full GC, and moves objects of the active classes among (living) surviving objects to active sub-heaps. In this case, if a large number of objects need to be moved, they are moved by using multiple full GC rounds.

Figure 9:
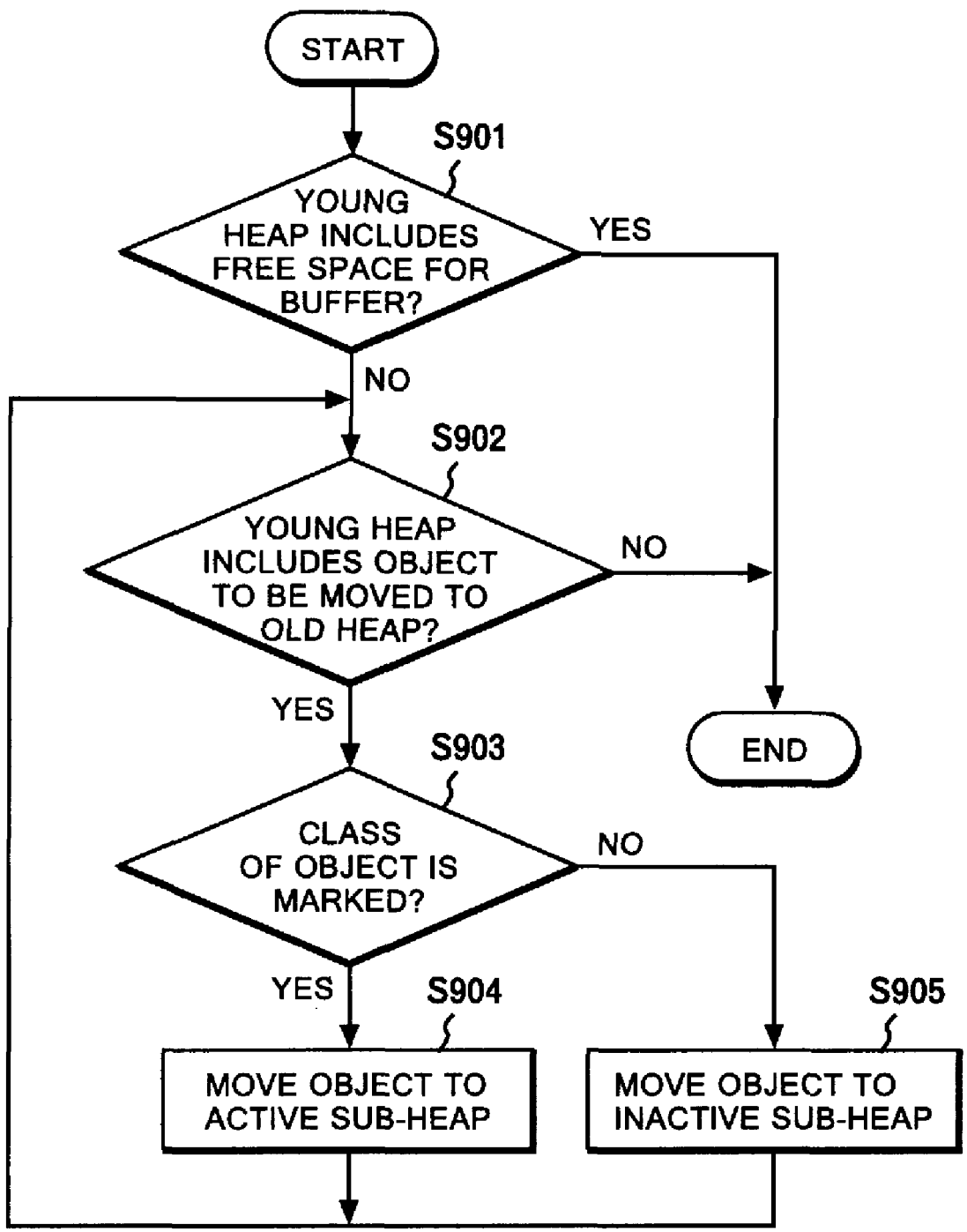
FIG. 9 is a flowchart for processing moving objects of classes of active classes in the young heap to active sub-heaps of the old heap.

Additionally, this information on compaction can be used in minor GC. FIG. 9 is a flowchart for moving objects in classes marked as an active class in the young heap to active sub-heaps of the old heap. First, the computer system determines whether or not the young heap has free space for a buffer (S901). If the young heap has no free space, the computer system determines whether or not the young heap has any objects to be moved to the old heap by GC (S902). If the young heap includes such an object, the computer system determines whether or not the object's class is marked as an active class (S903). If the class is marked, the computer system moves the object to any of the active sub-heaps (S904). On the other hand, if the class is not marked, the computer system moves the object to any of inactive sub-heaps (S905).

By moving objects from the young heap to the old heap during minor GC, the computer system moves objects of compaction-target classes among the moving-target objects to the active sub-heaps.

In addition, if a compaction-target object class is not included in the sampling profile for a certain period (predetermined period), the computer system regards the class as no longer being accessed since the program behavior changed. Accordingly, the computer system excludes the class from the compaction target, and thus moves objects of this class from the active sub-heaps to the other sub-heaps during compaction.

Moreover, if any sub-heap does not have objects to be accessed (that is, if any sub-heap is excluded from the young heap, or is an inactive sub-heap in the old heap), the rank to which a memory area allocated to the sub-heap belongs is set to power saving mode. This mode switching can be performed actively or passively. For example, when excluding a sub-heap from the young heap (S608 of FIG. 6) by the active switching method, the VM 12 causes the OS to issue an command to set the rank that is associated to the excluded sub-heap by OS to a power saving mode (S203 of FIG. 2).

Meanwhile, when adding a sub-heap to the young heap by the active switching method, the VM 12 instructs to set the rank associated to the added sub-heap to a normal mode. Here, a memory controller has a function of receiving a command to switch to the power saving mode from the outside. The OS has a function of issuing this command via, for example, an I/O port.

Though this requires the OS or hardware to have more functions, this active switching method can make the power saving period longer than the passive switching method. This is because the active switching method requires no access to memory 13, which allows a speedy determination. Moreover, the active switching method allows an earlier determination of which memory areas are about to be accessed. Consequently, the active switching method allows the memory controller to set the memory area to normal mode faster, which reduces the adverse effects of GC on program execution speed.

Meanwhile, in the passive switching method, the memory controller observes the memory access history. For example, if a certain memory area has not been accessed for a predetermined period, the memory controller sets the memory area to power saving mode. When the memory area is accessed again, the memory controller switches the mode back to normal mode.

Moreover, in order to be easily implemented in the memory controller, the passive switching method can cause the memory controller to set a certain memory area to power saving mode if the memory area has not been accessed for 100,000 cycles. In addition, the passive switching method can cause the memory controller to switch the mode to the normal mode when the memory area is accessed again. Specifically, a counter is provided for each rank, and the value of the counter is reduced by one per cycle. If the value reaches zero, the memory controller switches the mode of the rank to power saving mode. While no reference is made to the objects in the rank, each counter remains to indicate the initial value representing a threshold and is reset to the initial value every time the memory area belonging to the corresponding rank is accessed.

Figure 10:
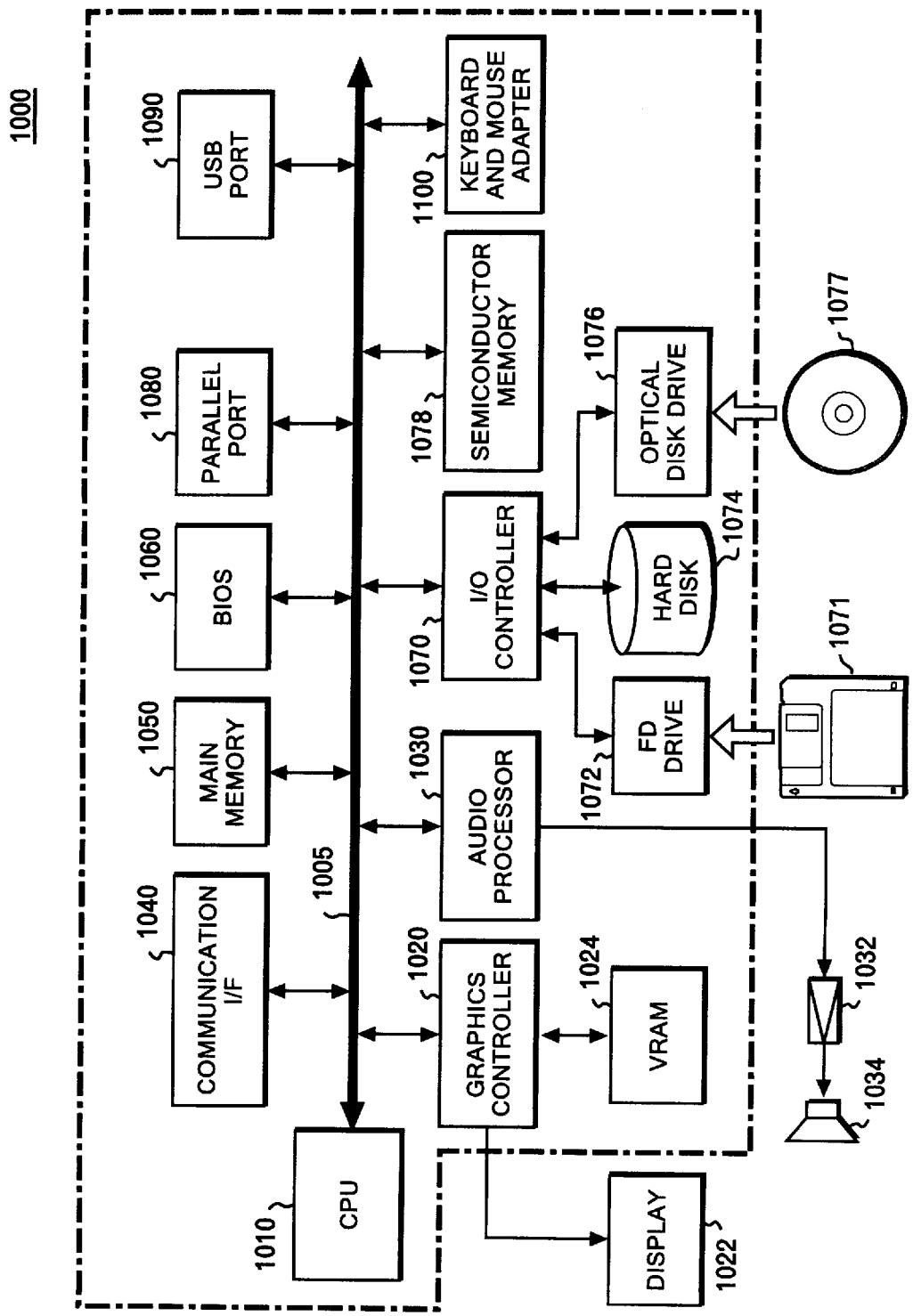
FIG. 10 shows a hardware configuration of an apparatus that executes a power control program according to an embodiment of the present invention.

FIG. 10 shows a hardware configuration of an apparatus that executes a power control program according to the embodiment of the present invention. In FIG. 10, the apparatus that executes the power control program is shown as an information processor 1000, and its hardware configuration is illustrated in the example. The following description is given of the overall configuration, assuming that the apparatus is an information processor which is typically a computer. However, it goes without saying that any minimum configuration can be alternatively employed in accordance with the use environment.

The information processor 1000 includes a central processing unit (CPU) 1010, a bus line 1005, a communication I/F 1040, a main memory 1050, a basic input/output system (BIOS) 1060, a parallel port 1080, a USB port 1090, a graphics controller 1020, a VRAM 1024, an audio processor 1030, an I/O controller 1070, and input means such as a keyboard and mouse adapter 1100. Storage means such as a flexible disk (FD) drive 1072, a hard disk 1074, an optical disk drive 1076 and a semiconductor memory 1078 can be connected to the I/O controller 1070.

A microphone 1036, an amplifier circuit 1032 and a loudspeaker 1034 are connected to the audio processor 1030. A display 1022 is connected to the graphics controller 1020.

The BIOS 1060 stores a boot program executed by CPU 1010 during the boot-up of the information processor 1000. This program depends on several things such as the hardware of the information processor 1000. The FD drive 1072 reads a program or data from a flexible disk 1071, and provides the program or the data to the main memory 1050 or the hard disk 1074 via the I/O controller 1070. Although FIG. 10 shows that the hard disk 1074 is included in the information processor 1000, a hard disk can be externally connected or added to the information processor 1000 by connecting an external device connection interface (not shown) to the bus line 1005 or the I/O controller 1070.

Examples of drives usable as the optical disk drive 1076 include, a DVD-ROM drive, a CD-ROM drive, a DVD-RAM drive, and a Blu-ray Disk (BD)-ROM drive. To use any of these drives, an optical disk 1077 corresponding to the drive needs to be used. The optical disk drive 1076 is capable of reading a program or data from the optical disk 1077, and providing the program or the data to the main memory 1050 or the hard disk 1074 via the I/O controller 1070.

A computer program is stored in a storage medium such as the flexible disk 1071, the optical disk 1077 or a memory card, and provided to the information processor 1000 by a user. The computer program is executed after being installed onto the information processor 1000 by being read from the storage medium via the I/O controller 1070, or by being downloaded via the communication I/F 1040. The operations that the computer program causes the information processor 1000 to perform are the same as those of the apparatus which have already been described, and thus the description will be omitted.

The computer program can be stored in an external storage medium. Media usable as the storage medium include a magneto-optical storage medium, such as a MD, and a tape medium, in addition to the flexible disk 1071, the optical disk 1077 and a memory card. Alternatively, the computer program can be provided to the information processor 1000 via a communications line by using a storage device such as a hard disk or an optical library provided on a server system connected to a dedicated communication line or the Internet as a storage medium.

The above description has mainly described the information processor 1000. However, a program having the foregoing functions of the information processor can be installed on a computer to operate the computer as the information processor. Thereby, the computer can implement the same functions as those of the foregoing information processor.

The apparatus can be implemented by hardware, software, or a combination of both. Implementation with a computer system having a predetermined program is an example of an implementation by a combining hardware and software. In such a case, the predetermined program is loaded and executed on the computer system, thereby causing the computer system to perform processing according to an embodiment of the present invention. The program consists of an instruction set which can be expressed in any selected language, codes or expressions. Such an instruction set enables the system to directly execute a particular function, or to execute the particular function after being subjected to any one or both of the following: (1) conversion into any other language, codes or expressions and (2) copy to another medium. As a matter of course, the scope of the embodiments of the present invention includes not only a program itself, but also a program product including a medium containing the program. The program for implementing the functions of the embodiments of the present invention can be stored in any computer readable medium such as a flexible disk, an MO, a CD-ROM, a DVD, a hard disk device, a ROM, a RAM, a magnetoresistive RAM (M-RAM) and a flash memory. The program to be stored in the computer readable medium can be obtained by downloading the program from another computer connected through a communications line, or by making a copy of the program in another medium. Moreover, the program can be compressed to be stored in a single storage medium, or divided into multiple pieces to be stored in multiple storage media.

The embodiments of the present invention can be combined with existing techniques such as using a timer to switch a component of an apparatus that has been idling for a certain period to a stand-by mode as needed. Techniques thus combined are also included in the technical scope of the embodiments of the present invention. Likewise, the technical scope of the embodiments of the present invention also includes a system that executes the power saving mode by employing the technique of the embodiments of the present invention. Moreover, the technique of the embodiments of the present invention can be provided in a program form allowing the steps for controlling power consumption to be stored in a field-programmable gate array (FPGA), an application-specific integrated circuit (ASIC), a hardware logic device comparable to the FPGA and ASIC, a programmable integrated circuit, or a combination of these, and thus as a program product. To be more specific, means for implementing the power saving mode according to embodiments of the present invention can be provided in a form of a custom large scale integrated (LSI) circuit which includes data input/output terminals, a data bus, a memory bus, a system bus and the like. These forms of a program product as an integrated circuit storing the implementation means is also included in the technical scope of the embodiments of the present invention.

As described above, the embodiments of the present invention (i) allow a heap area of a memory to be divided into multiple sub-heap areas, (ii) manage the sub-heap areas and (iii) allow the number of the sub-heap areas used for garbage collection to be dynamically changed on the basis of a magnitude correlation between a required time for the garbage collection and a predefined target value. Thus, the embodiments of the present invention have the effect of reducing the power consumption of memory by allowing memory to be reliably switched to power saving mode without causing performance deterioration, even in a computer which performs garbage collection.

The embodiments of the present invention have been described. However, the embodiments of the present invention are not limited to the foregoing embodiments. Further, the effects described in the embodiments of the present invention are merely a list of the most preferable effects produced by the present invention. Hence, the effects of the embodiments of the present invention are not limited to those described in the embodiments of the present invention.

The invention claimed is:

1. A memory power control method for controlling memory power consumption, the method being used in a computer which (i) includes a memory having a power saving mode and (ii) performs, by a garbage collection unit, a garbage collection for collecting no-longer-needed objects in groups, said no-longer-needed objects being allocated to memory blocks obtained by dividing a memory's address space by a predetermined constant size, the method comprising the steps of:

dividing, by a dividing unit, a heap area of the memory into a plurality of sub-heap areas;

managing, by a managing unit, the sub-heap areas;

changing, by a changing unit, the number of the sub-heap areas used for said garbage collection based on a magnitude correlation between a required time for the garbage collection and a predefined target value;

identifying, by an identification unit, living objects and said living object's class according to an access profile which contains information regarding access to said objects, wherein living objects are objects which are accessed for more than a predefined period;

bringing, by a bringing unit, the living objects together into a predetermined sub-heap area while performing the garbage collection;

moving, by a moving unit, objects to an old heap area, that are living even after performing minor garbage collection more than a predetermined number of rounds wherein said garbage collection is generational garbage collection;

dividing, by a dividing unit, said heap area into a young heap area and an old heap area;

allocating, by an allocation unit, said objects to the young heap area; and performing, by a garbage collection unit, minor garbage collection when the young heap area is entirely exhausted, wherein minor garbage collection is garbage collection performed only on the young heap area;

performing, by a garbage collection unit, full garbage collection when the old heap area is entirely exhausted, wherein full garbage collection is garbage collection performed on the entire heap; and bringing the living objects existing in the old heap area together into a predetermined sub-heap area of the old heap area when performing the full garbage collection.

2. The memory power control method according to claim 1, wherein, in the first step, the computer generates and manages sub-heap areas each corresponding to a memory block on which the power consumption control is performed at a single timing among the memory blocks.

3. The memory power control method according to claim 1, wherein the managing step further comprises changing, by a changing unit, the number of the sub-heap areas used for the garbage collection based on garbage collection frequency.

4. The memory power control method according to claim 1, wherein said garbage collection is generational garbage collection.

5. The memory power control method according to claim 1, further comprising the step of performing, by a garbage collection unit, full garbage collection if the old heap area is entirely exhausted, wherein full garbage collection is garbage collection on the entire heap area.

6. The memory power control method according to claim 1, further comprising the step of bringing, by a bringing unit, the living objects existing in the old heap area together into a predetermined sub-heap area of the old heap area when performing the full garbage collection.

7. A computer readable article of manufacture tangibly embodying non-transitory computer readable instructions which, when executed, cause a computer device to implement a method for controlling memory power consumption comprising the steps of:

- dividing, by a dividing unit, a heap area of the memory into a plurality of sub-heap areas;
- managing, by a managing unit, the sub-heap areas;
- changing, by a changing unit, the number of the sub-heap areas used for said garbage collection based on a magnitude correlation between a required time for the garbage collection and a predefined target value;
- identifying, by an identification unit, living objects and said living object's class according to an access profile which contains information regarding access to said objects wherein living objects are objects which are accessed for more than a predefined period;
- bringing, by a bringing unit, the living objects together into a predetermined sub-heap area while performing the garbage collection;
- moving, by a moving unit, objects to an old heap area, that are living even after performing minor garbage collection more than a predetermined number of rounds wherein said garbage collection is generational garbage collection;
- dividing, by a dividing unit, said heap area into a young heap area and an old heap area;
- allocating, by an allocation unit, said objects to the young heap area; and
- performing, by a garbage collection unit, minor garbage collection when the young heap area is entirely exhausted, wherein minor garbage collection is garbage collection performed only on the young heap area;
- performing, by a garbage collection unit, full garbage collection when the old heap area is entirely exhausted, wherein full garbage collection is garbage collection performed on the entire heap; and
- bringing the living objects existing in the old heap area together into a predetermined sub-heap area of the old heap area when performing the full garbage collection.

8. The computer readable article of manufacture according to claim 7, wherein, in the first step, the computer generates and manages sub-heap areas each corresponding to a memory block on which the power consumption control is performed at a single timing among the memory blocks.

9. The computer readable article of manufacture according to claim 7, wherein the managing step further comprises changing, by changing unit, the number of the sub-heap areas used for the garbage collection based on garbage collection frequency.

10. The computer readable article of manufacture according to claim 7, wherein said garbage collection is generational garbage collection.

11. The computer readable article of manufacture according to claim 7, further comprising the step of performing, by a garbage collection unit, full garbage collection if the old heap area is entirely exhausted, wherein full garbage collection is garbage collection on the entire heap area.

12. The computer readable article of manufacture according to claim 7, further comprising the step of bringing, by a bringing unit, the living objects existing in the old heap area together into a predetermined sub-heap area of the old heap area when performing the full garbage collection.

* * * * *